Aug. 21, 1945.  M. A. DURAND  2,383,115
PHOTOGRAPHIC LENS
Filed April 17, 1943

INVENTOR.
MILO A. DURAND
BY
ATTORNEYS.

Patented Aug. 21, 1945

2,383,115

UNITED STATES PATENT OFFICE 2,383,115

PHOTOGRAPHIC LENS

Milo A. Durand, Jackson Heights, N. Y., assignor to C. P. Goerz American Optical Company, a corporation of New York Application April 17, 1943, Serial No. 483,368

8 Claims. (Cl. 88—57)

This invention relates to improvements in photographic objectives and has for an object the provision in photographic objectives particularly those suitable for wide angle work, to reduce the field curvature and astigmatism to a reasonably small value over a large field, which field may attain or may exceed 90°.

Another object of the invention is to reduce the spherical aberration of such lenses to thereby enable a sharp focussing to be obtained with large apertures throughout the field.

Yet another object of the invention is to reduce distortion in photographic objectives suitable for wide angle work.

Other objects and advantages of the invention will be apparent to those skilled in the art.

In photographic objectives suitable for wide angle work, a principal difficulty in the prior art has been the reduction of distortion.

Another difficulty in the objectives of the prior art was the reduction of field curvature and astigmatism to a small value over a wide field while maintaining reasonable curvature of the elements.

Another difficulty has been in the reduction of spherical aberration, and it has therefore been difficult to obtain a sharp focus with large apertures both in the center and at the edges of the field.

My new and improved photographic objective has the above mentioned undesirable defects reduced.

In the accompanying drawing, which is given by way of example—

Figure 1:
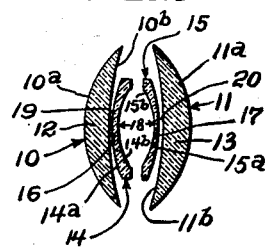
Figure 1 is an objective form of four meniscus lens elements with spherical refracting surfaces, symmetric about the center of the objective.

Referring now to Figure 1, which illustrates an objective employing four meniscus lens elements with spherical refracting surfaces, symmetrical about the center of the objective, the outer lens elements 10 and 11, respectively, which are the first and fourth traversed by the light in passing from the object to the image, are of convex meniscus form, the convex surfaces being designated by the numerals 10$^a$ and 11$^a$. The lens element 10 also has a concave surface 10$^b$ facing the center of the objective; and likewise the lens 11 has a concave surface 11$^b$ facing the center of the objective.

The radii of curvature of the surfaces 10$^a$ and 11$^a$ may be between one-sixth and one-quarter of the focal length of the objective. The radii of curvature of the inner concave surfaces 10$^b$ and 11$^b$ may be between one-half and two-thirds of the focal length; while the axial thicknesses 12 and 13 should each be between four and twelve percent of the focal length.

The elements 14 and 15, which are the second and third elements traversed by the light and passing from the object to the image, also include convex surfaces 14$^a$ and 15$^a$ respectively, the radii of which should be between one-fifth and one-third of the focal length of the objective. The radii of the inner concave surfaces 14$^b$ and 15$^b$ should be between ten and twenty percent of the focal length of the objective; while the axial thicknesses 16 and 17 should be less than twenty percent of said focal length.

For good correction and convenient form, the axial separation 18 between the surfaces 14$^b$ and 15$^b$ should fall between four and twelve percent of the focal length of the objective; while the axial separation 19 and 20 should each be less than one percent of the focal length of the objective.

*Example I*

| Designated Fig. 1 | Radius | Axial thickness | Material | Index (D light) | Dispersion constant |
|---|---|---|---|---|---|
| $r_1$ or $r_8$ | 10$^a$ or 11$^a$ | +20.118 | | | |
| $d_1$ | 12 or 13 | | 4.84 | Glass | 1.588 | 53.4 |
| $r_2$ or $r_7$ | 10$^b$ or 11$^b$ | −55.801 | | | |
| $d_2$ | 19 or 20 | | 0.316 | Air | 1.000 | |
| $r_3$ or $r_6$ | 14$^a$ or 15$^a$ | +25.089 | | | |
| $d_3$ | 16 or 17 | | 1.052 | Glass | 1.636 | 34.8 |
| $r_4$ or $r_5$ | 14$^b$ or 15$^b$ | −15.196 | | | |
| $d_4$ | 18 | | 7.366 | Air | | |

The equivalent focus is 100, the relative aperture may be f:6 or greater. A positive radius indicates a convex surface, a negative radius a concave surface.

I have further discovered that a very high degree of correction for distortion may be attained with an arrangement of the type above described by making it slightly asymmetric in a manner to be described hereinafter. This method of correction is not, however, necessarily limited to the construction described above, as it may be applied to a wide range of constructions comprising or including four meniscus lens elements.

The distortion prevailing in the construction described in connection with Example I and similar constructions may be reduced by: (a) decreasing the outer radius of the fourth element with respect to the outer radius of the first element; (b) increasing the inner radius of the fourth element with respect to the inner radius of the first element; (c) increasing the thickness of the fourth element with respect to that of the first element; (d) increasing the spacing between the third and fourth elements with respect to the spacing between the first and second (e) by decreasing the outer radius of the third element with respect to the outer radius of the second element; (f) increasing the inner radius of the third element with respect to the radius of the second element; or (g) increasing the thickness of the third element with respect to the thickness of the second element. Any of these methods, or any combination of them, may be employed.

Most desirable among these are the correction by increasing the inner radius of the fourth element with respect to that of the first, as tending to correct high order distortion, and that by increasing the inner radius of the third element with respect to that of the second, tending to correct, in addition to distortion, the coma introduced by the method referred to just previously.

It may further be desirable to use some of the other corrections in a reverse sense to add distortion of a low order and thereby permit improved correction of distortion over a wide field, or using therewith others of the corrections mentioned above.

A suitable correction for other aberrations may be achieved without further disturbing the symmetry of the objective.

For convenience of manufacture, it is desirable to maintain symmetry as well as is consistent with performance, and in order to avoid excessive curvature of the inner elements, it is desirable to have the axial separation between them less than 80% of the average of their inner radii.

Figure 2:
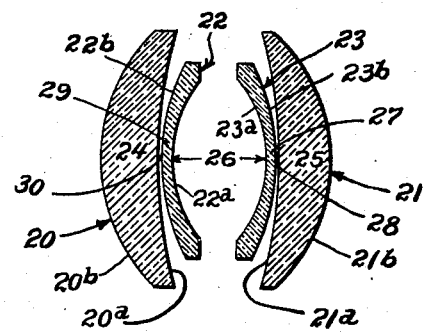
Figure 2 illustrates a modification of the arrangement shown in Figure 1.

With this construction, which is illustrated in Figure 2, it has been found possible to design objectives with distortion of the order of 1/100 of one percent of the focal length over a 90° field for an infinitely distant object plane.

A typical example of such a construction departs from the symmetric type described above, in connection with Figure 1, in that the inner radius 21ª of the fourth element 21 exceeds the inner radius 20ª of the first element 20 by more than 10%. The inner radius 23ª of the third element 23 exceeds the inner radius 22ª of the second element 22 by more than one percent. The thickness 25 of the fourth element 21 exceeds the thickness 24 of the first element 20 by more than 5%, and the outer radius 21ᵇ of the fourth element 21 is greater than the outer radius 20ᵇ of the first element. This last of course is a correction in the reverse sense as described above. Details of a suitable design of this type are given in the following example.

*Example II*

|   | Designated Fig. 2 | Radius | Axial thickness | Material | Index (D light) | Dispersion constant |
|---|---|---|---|---|---|---|
| $r_1$ | 20ᵇ | +33.07 | | | | |
| $d_1$ | 24 | | 9.87 | Glass | 1.620 | 60.3 |
| $r_2$ | 20ª | −83.48 | | | | |
| $d_2$ | 30 | | 0.793 | Air | 1.00 | |
| $r_3$ | 22ᵇ | +42.37 | | | | |
| $d_3$ | 29 | | 2.11 | Glass | 1.617 | 38.5 |
| $r_4$ | 22ª | −24.54 | | | | |
| $d_4$ | 26 | | 17.97 | Air | | |
| $r_5$ | 23ª | −25.60 | | | | |
| $d_5$ | 27 | | 2.11 | Glass | 1.617 | 38.5 |
| $r_6$ | 23ᵇ | +42.37 | | | | |
| $d_6$ | 28 | | 0.793 | Air | | |
| $r_7$ | 21ª | −102.10 | | | | |
| $d_7$ | 25 | | 11.45 | Glass | 1.620 | 60.3 |
| $r_8$ | 21ᵇ | +36.04 | | | | |

The equivalent focus of this example is approximately 153.5 mm., the aperture may exceed f:6.

This method of correcting for distortion is not necessarily limited to objectives as described above, but may be used on objectives of four meniscus elements in which the spacing between the inner concave elements exceeds 80% of the average of the inner radii of the inner elements, and having as a result the inner elements strongly curved.

Such lenses can be well corrected for distortion by a process as described above involving increasing the radii of the inner surfaces of the third and fourth elements with respect to the inner radii of the second and first elements, with other departures from symmetry as described above if desired or necessary.

It is also possible to aid in the correction of distortion by placing a plane parallel or nearly plane parallel plate of glass behind the fourth element, between it and the image.

It is advantageous to have the anterior surface of this plate, facing the fourth element, slightly convex to aid in the correction of higher order distortion. This method may be used in conjunction with the other methods (in direct or reversed sense) as described above. Typical of this construction is Example III, illustrated in Figure 3.

*Example III*

Figure 3:
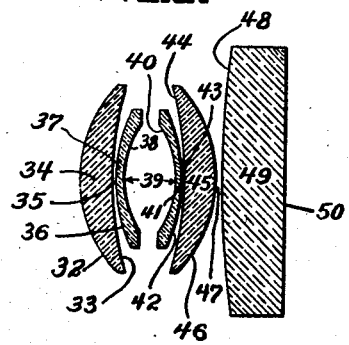
Figure 3 illustrates a further modification wherein further correction of distortion is effected by placing an additional element between the lens and the image.

|   | Designated Fig. 3 | Radius | Axial thickness | Material | Index (D light) | Dispersion constant |
|---|---|---|---|---|---|---|
| $r_1$ | 32 | +27.477 | | | | |
| $d_1$ | 34 | | 6.687 | Glass | 1.589 | 53.4 |
| $r_2$ | 33 | −74.710 | | | | |
| $d_2$ | 35 | | 0.436 | Air | 1.00 | |
| $r_3$ | 36 | +34.660 | | | | |
| $d_3$ | 37 | | 1.454 | Glass | 1.636 | 35.4 |
| $r_4$ | 38 | −20.993 | | | | |
| $d_4$ | 39 | | 10.175 | Air | | |
| $r_5$ | 40 | −20.993 | | | | |
| $d_5$ | 41 | | 1.454 | Glass | 1.636 | 35.4 |
| $r_6$ | 42 | +35.078 | | | | |
| $d_6$ | 43 | | 0.436 | Air | | |
| $r_7$ | 44 | −69.502 | | | | |
| $d_7$ | 45 | | 5.814 | Glass | 1.589 | 53.4 |
| $r_8$ | 46 | +27.348 | | | | |
| $d_8$ | 47 | | 1.309 | Air | | |
| $r_9$ | 48 | +726.798 | | | | |
| $d_9$ | 49 | | 11.919 | Glass | 1.517 | 64.5 |
| $r_{10}$ | 50 | Infinity | | | | |

The equivalent focus of this example is 138 mm., a suitable aperture is f:10.

Although I have herein illustrated and described my improved method of correcting photographic objectives for wide angle work and I have shown three examples of such correction, it is obvious that many changes may be made in the arrangements herein shown and described without departing from the spirit of the invention as set forth in the annexed claims.

What is claimed is:

1. A photographic objective lens system comprised of at least four glass elements with spherical refracting surfaces, said elements being grouped in pairs axially spaced apart a distance greater than three-and-one-half per cent and less than thirteen per cent of the focal length of said system, the outer surfaces of the two outer elements having radii of between one-fifth and one-fourth of the focal length of said system and having inner surfaces the radii of which lie between one-half and two-thirds of said focal length, the refractive index of the two inner elements being less than 1.65.

2. A photographic objective lens system according to claim 1, in which the axial spacing between the elements of said pairs is less than one per cent of the focal length of said system, and in which the difference between the radii of the adjacent concave and convex surfaces of either of said pairs is between twenty-five and thirty-three per cent of the equivalent focal length of said system.

3. A photographic objective lens system according to claim 1, in which said four glass elements are meniscus lens elements, and in which said pairs are symmetric about the center of the objective, in which the radii of curvature of the inner surfaces of the outer lenses lie between four and six-tenths of the focal length of the system and the radii of curvature of the outer surfaces of the outer lenses lie between one-sixth and one-fourth of the focal length of said system.

4. In a photographic objective lens system, four meniscus lens elements, each having spherical refracting surfaces which are concave toward and symmetric about the center of said objective, the two outer lenses being of convex meniscus form and having outer surfaces the radii of which lie between one-sixth and one-fourth of the focal length of said objective and inner surfaces the radii of curvature of which lie between one-half and two-thirds of the focal length, the two inner lenses of said objective being of concave meniscus form having outer surfaces the radii of which lie between one-fifth and one-third of the focal length of the objective and inner surfaces the radii of which lie between ten and twenty per cent of the focal length, the axial thickness of the outer lens elements being between four and twelve per cent of the focal length and the axial thickness of the inner elements being less than five per cent of the focal length, the axial separation between adjacent inner and outer lens elements being less than one per cent of the focal length, and the axial separation between the inner surfaces of the inner lenses being between four and twelve per cent of the focal length of said objective.

5. A photographic objective lens system according to claim 4, which is corrected for spherical aberration for a relative aperture of f:6 or more, suitable for sharply covering a field of 90° or more, and having an axial spacing between the inner surfaces of said inner elements of less than eighty per cent of the length of the average of the inner radii of said inner elements.

6. In a photographic objective lens system, in combination, four meniscus lens elements with surfaces concave with respect to the center of said objective, the two outer elements of said system being convex meniscus form and the two inner elements being of concave meniscus form, said combination having distortion of magnitude less than one-tenth of one per cent of the focal length over a field greater than eighty degrees for an infinite object distance, the curves of the surfaces of said elements being substantially shallow and easy to form, the length of the radius of the inner surface of the fourth element in the order traversed by the light from said object being at least ten per cent greater than that of the radius of the inner surface of the first element traversed by said light, and the radius of the inner surface of the third element traversed by said light being of a length at least one per cent greater than the radius of the inner surface of the second element traversed by said light, the refractive index of said last two elements being less than 1.65, the radii of the outer surfaces of said first and said fourth elements being between one-sixth and one-fourth of the focal length of said system and the radii of curvature of the inner surfaces of said first and fourth elements being between one-half and three-quarters of said focal length, the outer radii of the outer surfaces of the second and third elements traversed, by said light, being between one-fifth and one-third of said focal length and the inner radii of said last-mentioned elements being between one-tenth and one-fifth of said focal length, the axial thickness of said first and fourth elements being between four and twelve per cent of the focal length and the axial thickness of said second and third elements being less than five per cent of the focal length, the axial separation between said first and second elements and said third and fourth elements being less than one per cent of said focal length, and the axial separation between the inner surfaces of said second and third elements being between four and twelve per cent of the focal length.

7. A photographic objective lens system according to claim 4, in which a glass plate of a thickness greater than five per cent of the focal length of said system and having at least one surface with a radius of curvature of less than twenty times said focal length, is positioned between the end element nearest the image produced by said system, and said image.

8. The invention according to claim 4 in which a ray passing through the center of the system and entering said system from the object at an angle of substantially 45 degrees to the axis of said system intersects each surface at a distance from said lens axis of less than ¾ of the radius of the surface which said beam enters.

MILO A. DURAND.